United States Patent [19]

Tanaka

[11] 4,446,531

[45] May 1, 1984

[54] COMPUTER FOR CALCULATING THE SIMILARITY BETWEEN PATTERNS

[75] Inventor: Atsuo Tanaka, Nabari, Japan

[73] Assignee: Sharp Kabushiki Kaisha, Osaka, Japan

[21] Appl. No.: 255,497

[22] Filed: Apr. 20, 1981

[30] Foreign Application Priority Data

Apr. 21, 1980 [JP] Japan .................................. 55-53322

[51] Int. Cl.³ .......................... G06F 15/20; G10L 1/00
[52] U.S. Cl. ...................................... 364/728; 381/42; 364/513.5
[58] Field of Search ............ 364/728, 819, 513, 513.5; 179/1 SA, 1 SB, 1 SD; 340/146.3 R, 146.3 Q, 146.3 H, 146.3 WD; 381/36, 42, 43, 46, 47, 51

[56] References Cited

U.S. PATENT DOCUMENTS

| | | | |
|---|---|---|---|
| 3,521,235 | 7/1970 | Becker | 179/1 SA |
| 3,700,815 | 10/1972 | Doddington et al. | 179/1 SB |
| 4,059,725 | 11/1977 | Sakoe | 179/1 SD |
| 4,060,694 | 11/1977 | Suzuki et al. | 179/1 SB X |
| 4,256,924 | 3/1981 | Sakoe | 364/513 X |
| 4,286,115 | 8/1981 | Sakoe | 179/1 SD |

Primary Examiner—Joseph F. Ruggiero
Attorney, Agent, or Firm—Birch, Stewart, Kolasch & Birch

[57] ABSTRACT

A computer for calculating the similarity between first and second patterns, each represented by a sequence of feature vectors, comprises a calculating circuit for calculating a weighting factor from feature vectors in the first pattern, a weighting circuit for applying the weighting factor to the feature vectors of the second pattern to calculate an estimated vector for the second pattern, and a similarity calculating circuit for calculating and determining the similarity between the first and the second patterns on the basis of the feature vector of the first pattern and of the estimated vector of the second pattern.

4 Claims, 2 Drawing Figures

COMPUTER FOR CALCULATING THE SIMILARITY BETWEEN PATTERNS

BACKGROUND OF THE INVENTION

The present invention relates to a computer for calculating the similarity between at least two patterns.

The pattern to which the similarity computer is applicable may be a voice pattern, one or more printed or handwritten letters and/or figures, or any other patterns. See Sakoe et al, U.S. Pat. No. 3,816,722 issued June 11, 1974, entitled "Computer for Calculating the Similarity between Patterns and Pattern Recognition System Comprising the Similarity Computer".

In connection with a voice pattern, in particular, recognition of input voice information is carried out by comparing a feature vector formed by the input voice information and a reference pattern. This kind of comparison between the two patterns is, conventionally, performed by a matching method using a time warping method of dynamic programming to obtain the calculation of an extremum. This conventional pattern matching method can be considered to provide matching by modifying patterns with reference to their similarity through addition or removal of feature vectors.

The respective patterns have particular feature vectors which, inevitably, vary from one another owing to variations in time when each of these vectors is extracted or to a variation in voice sources. Such variation components may be great even if the matching takes place in connection with patterns belonging to the same category. These variations result in erroneous pattern recognition.

Therefore, it is desired to reduce the variable components of the feature vectors as much as possible.

SUMMARY OF THE INVENTION

Accordingly, it is an object of the present invention to provide an improved pattern similarity measuring system for calculating feature vectors with a small amount of variable components.

It is another object of the present invention to provide an improved pattern similarity measuring system for comparing or calculating similarity between patterns by using an estimated vector.

Briefly described, a computer of the present invention for calculating the similarity between first and second patterns, each represented by a sequence of feature vectors, comprises a calculating circuit for calculating a weighting factor based on elements of the feature vectors in an (i+1) step of the first pattern and in an i step thereof, a weighting circuit for applying the weighting factor to the feature vectors of the second pattern to calculate an estimated vector for the second pattern, and a similarity calculating circuit for calculating and determining the similarity between the first and the second patterns on the basis of the feature vector of the first pattern and of the estimated vector of the second pattern.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

Figure 1:
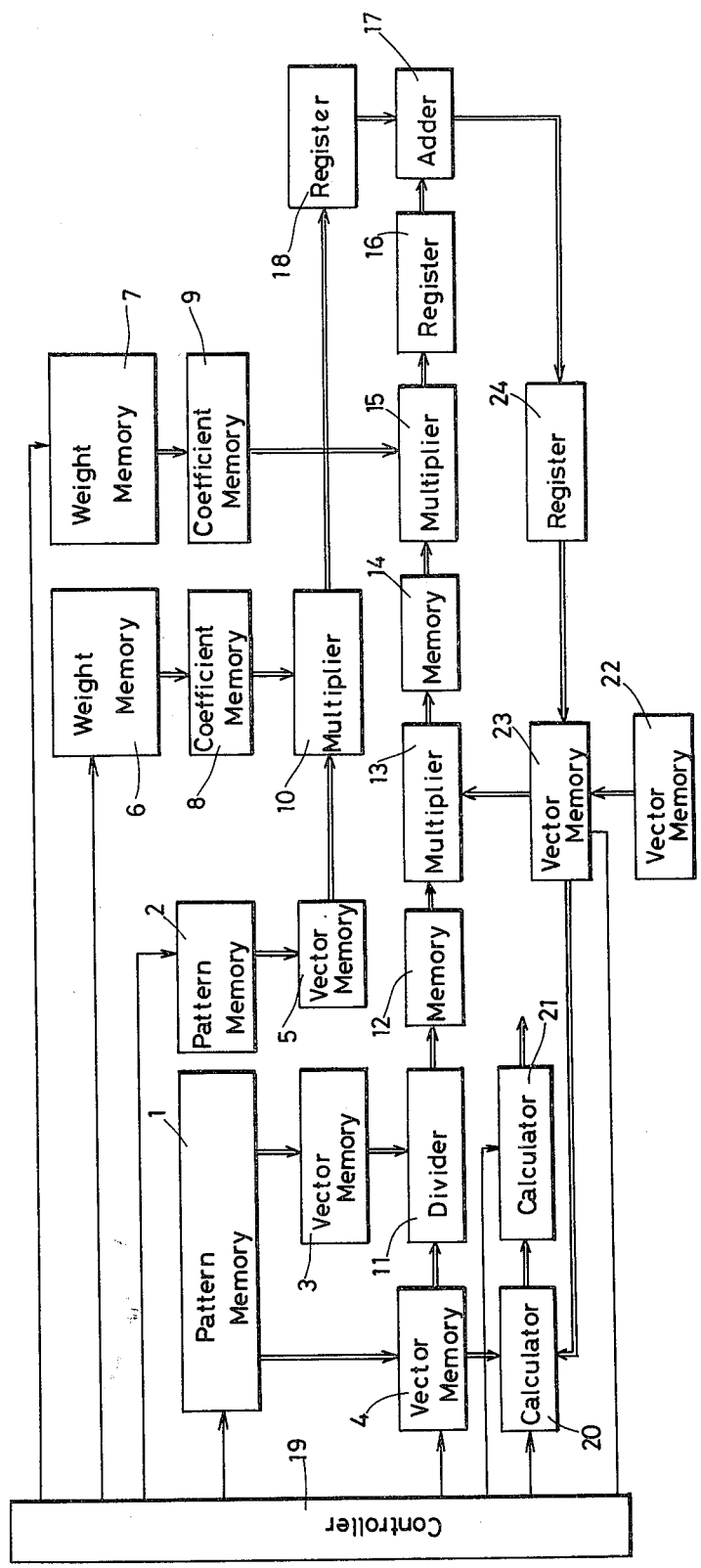
FIGS. 1 and 2 show circuits for calculating similarity between patterns according to the present inventoin.

A feature of the present invention is achieved by utilizing an estimated vector in place of a vector representing an input pattern.

A reference pattern A is formed by feature vectors $a_1, a_2 \ldots a_i \ldots a_n$ of sequences. An input pattern B is formed by feature vectors $b_1, b_2 \ldots b_j \ldots b_m$ of other sequences. The pattern A is compared with the pattern B in terms of their similarity.

A particular feature vector $a_{i+1}$ of a step (i+1) is represented as follows with a diagonal matrix $\Gamma_i$ and another feature vector $a_i$ of a just preceding step i.

$$a_{i+1} = \Gamma_i a_i$$

In other words, the respective diagonal elements of $\Gamma_i$ are obtained by dividing the respective elements of $a_{(i+1)}$ by the respective elements of $a_i$.

In connection with the pattern B, a vector $\tilde{b}$ has elements obtained by multiplying the respective elements of an estimated vector $\hat{b}$ given at the i step by the diagonal matrix $\Gamma_i$ given at the position for calculating the feature vector $a_{(i+1)}$.

Therefore, $$\tilde{b} = \Gamma_i \hat{b}$$

In case where the vector b is used in place of the estimated vector $\tilde{b}$, this means that, in the calculation system of the present invention, the feature vector $b_j$ of the pattern B corresponding to the feature vector $a_{(i+1)}$ of the pattern A is multiplied by all coefficients of "0" and the vector $\tilde{b}$ is multiplied by all coefficients of "1". In such a case, the estimated vector $\hat{b}$ depends merely on the initial value of this vector $\hat{b}$ and the variations in the vectors of the pattern A. No influence of the pattern B is applied to the estimated vector $\hat{b}$.

Accordingly, there may be the fear that the estimated vector $\hat{b}$ is greatly different from each of the feature vectors of the both patterns A and B, even though the both patterns belong to the same category, depending on the initial value of the estimated vector $\hat{b}$. In order to avoid such a fear, the estimated vector $\hat{b}$ is formed with reference to the vector $\tilde{b}$ and in addition, the pattern B.

In referring to the pattern B, great influence arises from the vector $\tilde{b}$ for calculating an estimated vector $\hat{b}$ and from weighting the feature vector $b_j$.

When a weighting factor is made constant in connection with the respective elements, the estimated vector $\hat{b}$ is obtained as a linear combination of the vector $\tilde{b}$ and the feature vector $b_j$, which explains the simplicity of the present invention. In practice, a weighting factor for the vector $\tilde{b}$ can be considered to be related to another weighting factor for the feature vector $b_j$ so that one can be calculated from the other.

Two weighting factors applied for the vector $\tilde{b}$ and the feature vector $b_j$ can be obtained in two manners. One is to calculate and memorize weighting factors in connection with one pattern to be matched and to extract the corresponding weighting factor in the respective steps of the pattern. The other is to subsequently calculate each of weighting factors in the respective steps of the pattern.

In the present invention, calculation is assumed to be enabled with respect to each of the elements of all the vectors so that a calculation unit can process each of the elements in parallel.

FIG. 1 shows a circuit for calculating the estimated vector $\hat{b}$ by extracting one of the stored weighting factors in each of the steps.

In the circuit of FIG. 1, a controller 19 is responsive to the correspondence between the feature vectors of the patterns A and B for generating instructions which enable one of the feature vectors to be transferred from pattern memories 1 and 2 to vector memories 3, 4, and 5. The controller 19 also controls processing timings. The pattern memory 1 stores the pattern A.

For calculation at the (i+1) step, it develops a feature vector $a_1$ of the pattern A as specified by the controller 19. The feature vector $a_i$ is entered into the vector memory 3. The memory 1 also develops another feature vector $a_{(i+1)}$ which is entered into the vector memory 4.

The pattern memory 2 stores the pattern B. It develops a feature vector $b_j$ of the pattern B as specified by the controller 19. The feature vector $b_j$ is entered into the vector memory 5. This feature vector $b_j$ corresponds to the feature vector $a_{(i+1)}$ since the input pattern B corresponds the reference pattern A by a nonlinear time warping method in terms of their proportional relation or their similarity.

A divider 11 is provided for calculating each ratio of the respective elements of the feature vector $a_{(i+1)}$ to the respective elements of the feature vector $a_i$ to obtain the result $\Gamma_i$ of the diagonal matrix.

$$\Gamma_i = a_{(i+1)}/a_i$$

The diagonal matrix $\Gamma_i$ is introduced into a memory 12 for the purpose of storage. A weight memory 6 is provided for storing weighting factors for the feature vector $b_j$ of the pattern B. In accordance with the instructions by the controller 19, it develops a combination of the weighting factors for the respective steps to a coefficient memory 8.

A weight memory 7 contains weighting factors for the vector $\hat{b}$ and develops a combination of them for the respective steps to a coefficient memory 9 in accordance with the instructions by the controller 19.

A multiplier 10 is provided so as to multiply the respective elements of the feature vector $b_j$ stored in the vector memory 5 by the respective elements of the weighting factors stored in the coefficient memory 8, depending on each kind of element. The results are introduced into a register 18. A vector memory 22 is provided for memorizing the initial value used to obtain the estimated vector $\hat{b}$ of the pattern B. The stored initial value is outputted into a vector memory 23 in accordance with the instructions by the controller 19 at the initial stage. In other stages except the initial stage, the estimated vector $\hat{b}$ developed by an adder 17 is applied to the vector memory 23 through a register 24.

A multiplier 13 is provided so as to enter into a memory 14 the results obtained by the multiplication of the value stored in the memory 12 by the values stored in the vector memory 23. Therefore, the memory 14 contains $\hat{b}(=\Gamma_i\hat{b})$ which is calculated by the multiplier 13 on the basis of the diagonal matrix $\Gamma_i$ and the respective elements of the estimated vector $\hat{b}$ obtained at the i step.

The vector $\hat{b}$ is multiplied by the weighting factor stored in the coefficient memory 9 by the multiplier 15. The results are applied to a register 16 for the purpose of storing the weighted vector $\hat{b}$. The register 18 stores the weighted feature vector $b_j$. The adder 17 adds the contents of the registers 17 and 18 to obtain the estimated vector $\hat{b}$ at the (i+1) step and to store it in the register 24. Thus, in place of the inputted pattern, the estimated vector $\hat{b}$ is calculated for calculation of the similarity.

A calculator 20 is provided for calculating the distance between the estimated vector $\hat{b}$ for the inputted pattern B, stored in the vector memory 23 and the feature vector $a_{(i+1)}$ for the reference pattern A, stored in the vector memory 4. The results are applied to a calculator 21 for calculating the similarity on the basis of the distance in the respective steps. The distance is defined as $|\hat{b} - a_{(i+1)}|$, $|\hat{b} - a_{(i+1)}|^2$, and so forth.

The calculator 21 is provided to obtain the similarity between the patterns A and B based on the distance between the estimated vector $\hat{b}$ and the feature vector $a_{(i+1)}$. The calculated results by the calculator 21 are applied to a detection unit of the following stage in accordance with the controller 19. In place of the feature vector $b_j$ obtained by the inputted pattern B, the estimated vector of the pattern B is used to obtain the similarity by contrast with the feature vector $a_{(i+1)}$ of the reference pattern A. Accordingly, the variable components in the feature vector are remarkably reduced to obtain the similarity measurement with good matching characteristics.

Figure 2:
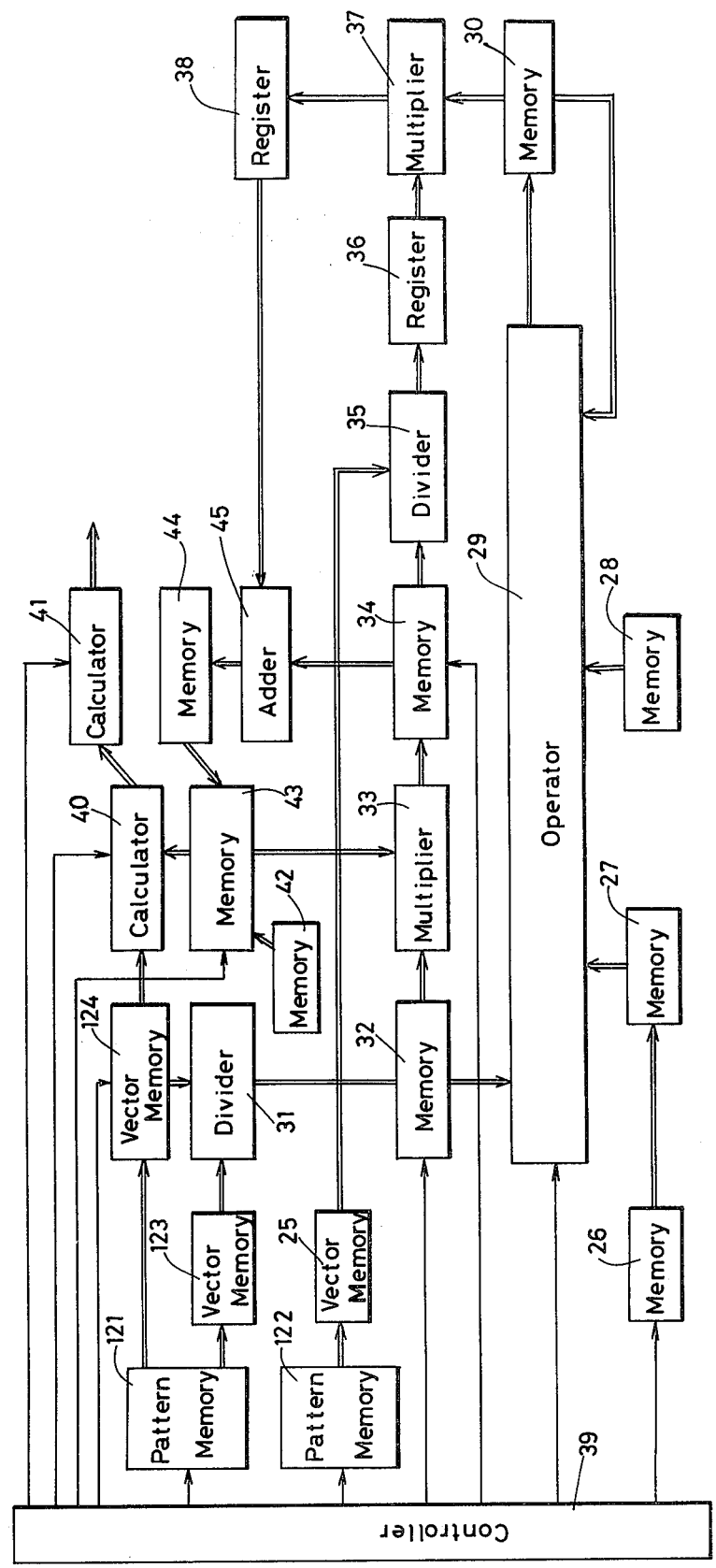

FIG. 2 shows a circuit for subsequently calculating each of the weighting factors in the respective steps of the pattern. In this circuit, the algorithm for calculating the estimated vector b is constructed as application of an algorithm for a Kalman filter, a linear system in which the mean squared error between the desired output and the actual output is minimized when the input is a random signal generated by white noise.

With reference to FIG. 2, a controller 39 is responsive to the correspondence between the feature vectors of the patterns A and B for generating instructions causing the corresponding feature vectors of the pattern B to be transferred and contrasted with the respective feature vectors of the pattern A by controlling their processing timing.

A pattern memory 121 is provided for storing the reference memory A so that each of the feature vectors $a_i$, as specified by the controller 30, is applied to a vector memory 123. Another feature vector $a_{(i+1)}$ is entered into a vector memory 124. A pattern memory 122 stores the inputted pattern B so that each of the feature vector $b_j$, as specified by the controller 39, is entered into a vector memory 25.

A divider 31 is coupled to the vector memories 23 and 24 for dividing the respective elements of $a_{(i+1)}$ by the respective elements of $a_i$ to obtain $\Gamma_i(=a_{(i+1)}/a_j)$. The results are applied to a memory 32 in order to apply them to a multiplier 33. A memory 43 is provided for storing another estimated vector $\hat{b}$ at the preceding step. This preceding estimated vector $\hat{b}$ stored in the memory 43 is multiplied by the diagonal matrix $\Gamma_i$ by the multiplier 33 to otain $\Gamma_i \hat{b} = \hat{b}$ and store the results in a memory 34. The contents of the memory 34 are outputted to a subtractor 35 and an adder 45 in accordance with the instructions by the controller 39.

It is assumed that the vectors of the inputted pattern B have variations due to errors. $\sigma_{k,\,i+1}$ indicates variance of the k-th element in the feature vector $b_j$ at the (i+1) step. $\gamma_{k,\,i}$ indicates the k-th diagonal element of the diagonal matrix $\Gamma_i$.

Under the circumstances, in the (i+1) step, a k-th element $\alpha_{k,\,i+1}$ of a weighting factor multiplied to one of the respective elements of the contents, $b_j - \hat{b}$, of the subtractor 35, is determined as follows:

$$\alpha_{k,i+1} = \frac{\beta_{k,i}}{\beta_{k,i} + \sigma_{k,i+1}}$$

where $\beta_{k,i} = \gamma_{k,i}{}^2 \times \sigma_{k,i} \times \alpha_{k,i}$.

In other words, when $\alpha_{k,i}$ is detected in the i step, $\beta_{k,i}$ is then detected and lastly $\alpha_{k,i+1}$ is calculated.

The weighting factor $\alpha_{k,i+1}$ in the (i+1) step can be calculated using $\sigma_{k,i}$, $\sigma_{k,i+1}$, $\gamma_{k,i}$ and the preceding weighting factor $\alpha_{k,i}$ in the i step.

An operator 29 is provided for calculating the weighting factors $\alpha$ according to the above principle and under control of the instructions by the controller 39. The calculated weighting factors are entered to a memory 30. For the purpose of calculating the weighting factors, a memory 26 is provided for containing the variance for each of the reference patterns. Such variance is applied to the operator 29 through a memory 27 under control by the controller 39.

A memory 28 is provided for storing the initial value of the weighting factor $\alpha$. At the initial stage, the initial value stored is introduced into the operator 29. In other steps except the initial stage, the results stored in the memory 30 which are given at the step just preceding are applied to the operator 29.

For the purpose of calculating the estimated vector, the diagonal matrix $\Gamma_i$ stored in the memory 32 is introduced into the operator 29 or the multiplier 33 under the instructions by the controller 39 to give the vector $\overline{b}(=\Gamma_i b)$. This vector $\overline{b}$ is stored in the memory 34 so that it is applied to the subtractor 35. Therefore, a calculation of $b_j - \overline{b}$ is calculated by extracting the vector $b_j$ from the vector memory 25. The results are applied to a register 36. The results $b_j - \overline{b}$ stored in this register 36 are applied to a multiplier 37. The multiplier 37 multiplies $b_j - \overline{b}$ by the weighting factors $\alpha$ stored in the memory 30.

The thus weighted vector is kept in a register 38 so that it is added by the vector $\overline{b}$ stored in the memory 34 by the adder 45. The results are assumed to be the estimated vector $\hat{b}$ in the (i+1) step and are stored in a memory 44. The memory 43 receives the initial value of the estimated vector $\hat{b}$ stored in the memory 42 at the initial stage. In other stages except the initial stage, it receives the estimated vector $\hat{b}$ stored in the memory 44 by control of the controller 39.

As is common to the embodiment of FIG. 1, a calculator 40 is provided for calculating the distance between the estimated vector $\hat{b}$ of the pattern B, stored in the memory 43, and the feature vector $a_{(i+1)}$ of the pattern A, stored in the memory 24. The calculated results are applied to a calculator 41 for calculating and determining their similarity between the patterns A and b, under control by the controller 39, on the basis of the distances given in the respective steps. The similarity detected by the calculator 41 is applied to a determination circuit under control by the controller 39.

As a feature of the present invention, a weighting factor is calculated from elements of the respective feature vectors in the (i+1) step of the reference pattern A and the i step thereof. Such a weighting factor is applied to the respective feature vectors of the pattern B to weight them and to calculate the estimated vector. The estimated vector is used in place of the inputted pattern B to calculate the similarity between the two patterns A and B. Therefore, the variable components of the feature vectors present in causing matching are remarkably reduced to provide good pattern matching.

The invention being thus described, it will be obvious that the same may be varied in many ways. Such variations are not to be regarded as a departure from the spirit and scope of the invention, and all such modifications are intended to be included within the scope of the following claims.

What is claimed is:

1. A computer for calculating the similarity between first and second patterns, the first pattern being represented by a first sequence of successive feature vectors $a_i$ (i=1, 2, ... I), where I=the number of feature vectors, the second pattern being represented by a second sequence of successive feature vectors $b_j$ (j=1, 2, ..., J), where J=the number of feature vectors, comprising:
    calculating means for calculating weighting factors from feature vectors $a_i$ and $a_{(i+1)}$ of the first pattern;
    weighting means for applying the weighting factors to the feature vectors of the second pattern to calculate estimated vectors for the second pattern; and
    similarity calculating means for calculating and determining the similarity between the two patterns by comparing the feature vectors of the first pattern and of the estimated vectors of the second pattern.

2. A computer for calculating the similarity between first and second patterns, the first pattern being represented by a first sequence of successive feature vectors $a_i$ (i=1, 2, ... I), where I=the number of feature vectors, the second pattern being represented by a second sequence of successive feature vectors $b_j$ (j=1, 2, ..., J), where J=the number of feature vectors,
    first calculating means for calculating a weighting factor from the feature vector $a_i$ in the i step and the feature vector $a_{i+1}$ in the (i+1) step;
    second calculating means for calculating a first estimated vector of the second pattern in the j step;
    third calculating means for calculating an additional vector by multiplying the elements of the first estimated vector by the weighting factor;
    fourth calculating means for calculating a second estimated vector of the second pattern in the (j+1) step by multiplying the weighting factor by each of the elements of the first estimated vector and the feature vector $b_j$ and adding their resultants where the feature vector $a_{(i+1)}$ in the (i+1) step of the first pattern corresponds to the feature vector $b_j$ of the second pattern;
    fifth calculating means for calculating the distance between the second estimated vector and the feature vector $a_{(i+1)}$ in each of the steps; and
    similarity calculating means for calculating and determining the similarity between the first and the second patterns on the basis of the distance detected by the fifth calculating means.

3. A method for calculating the similarity between first and second patterns, the first pattern being represented by a first sequence of successive feature vectors $a_i$ (i+1, 2, ... I), where I=the number of feature vectors, the second pattern being represented by a second sequence of successive feature vectors $b_j$ (j=1, 2, ..., J), where J=the number of feature vectors, comprising the steps of:

calculating weighting factors from feature vectors $a_i$ and $a_{(i+1)}$ of the first pattern;

applying the weighting factors to the feature vectors of the second pattern to calculate estimated vectors for the second pattern; and determining the similarity between the two patterns by comparing the feature vectors of the first pattern and the estimated vectors of the second pattern.

4. A method for calculating the similarity between first and second patterns, the first pattern being represented by a first sequence of successive feature vectors $a_i$ (i=1, 2, ... I, where I=the number of feature vectors, the second pattern being represented by a second sequence of successive feature vectors $b_j$ (j=1, 2, ..., J), where J=the number of feature vectors, comprising the steps of:

calculating a weighting factor from the feature vector $a_i$ in the i step and the feature vector $a_{i+1}$ in the (i+1) step;

calculating a first estimated vector of the second pattern in the j step;

calculating an additional vector by multiplying the elements of the first estimated vector by the weighting factor;

calculating a second estimated vector of the second pattern in the (j+1) step by multiplying the weighting factor by each of the elements of the first estimated vector and the feature vector $b_j$ and adding their resultants where the feature vector $a_{(i+1)}$ in the (i+1) step of the first pattern corresponds to the feature vector $b_j$ of the second pattern;

calculating the distance between the second estimated vector and the feature vector $a_{(i+1)}$ in each of the steps; and determining the similarity between the first and the second patterns on the basis of the distances detected.

* * * * *